United States Patent [19]

Weinberg

[11] Patent Number: 4,482,895

[45] Date of Patent: Nov. 13, 1984

[54] MULTI-CHANNEL MICROPOWER COMMUNICATION LINK

[75] Inventor: Stanley Weinberg, Los Angeles, Calif.

[73] Assignee: Wein Products, Inc., Los Angeles, Calif.

[21] Appl. No.: 365,657

[22] Filed: Apr. 5, 1982

[51] Int. Cl.$^{3}$ .......... H04Q 9/10

[52] U.S. Cl. .......... 340/825.69; 340/825.44; 340/825.36; 340/825.31

[58] Field of Search .......... 340/825.69, 825.72, 340/825.31, 825.44, 825.36; 455/105, 116, 95; 329/106, 107; 332/9 T, 14, 31 T

[56] References Cited

U.S. PATENT DOCUMENTS

| | | | |
|---|---|---|---|
| 3,366,881 | 1/1968 | Malone et al. | 332/9 T |
| 3,643,162 | 2/1972 | Ady | 455/95 |
| 3,936,616 | 2/1976 | DiGianfilippo et al. | 340/825.69 |
| 4,160,959 | 7/1979 | Maine | 332/31 T |
| 4,207,524 | 6/1980 | Purchase | 340/825.69 |
| 4,211,230 | 7/1980 | Woltosz | 332/14 |
| 4,232,297 | 11/1980 | Gerlach et al. | 340/825.65 |
| 4,283,790 | 8/1981 | Clock et al. | 332/9 T |
| 4,303,911 | 12/1981 | Hulick | 340/825.69 |
| 4,366,482 | 12/1982 | Remes et al. | 340/825.69 |
| 4,394,777 | 7/1983 | Wren | 455/95 |
| 4,426,637 | 1/1984 | Apple et al. | 340/825.65 |

*Primary Examiner*—Donald J. Yusko
*Attorney, Agent, or Firm*—Jackson, Jones & Price

[57] ABSTRACT

A remote controlling apparatus comprising a transmitter including a pulse generating circuit the output of which is a plurality of pulses of radiant energy having an envelope of a selected pulse width and a selected pulse interval and a receiver including an envelope detection circuit, the output of which is a plurality of pulses each having the selected pulse width and having the selected pulse interval of the transmitted radiant energy, concidence pulse generating means for generating coincidence pulses responsive to transitions in the output pulses from the envelope detection circuit, with one such coincidence pulse being generated at a selected time after a transition in each such output pulse and one being generated in coincidence with a transition in each such output pulse, the selected time being selected such that coincidence of the generated coincidence pulses will only occur when the output of the envelope detection circuit has a selected pulse width, and coincidence detection coupled to a triggering circuit for triggering the triggering circuit in response to a pre-selected number of detected coincidences of the coincidence pulses in a pre-selected time period.

16 Claims, 8 Drawing Figures

FIG. 6
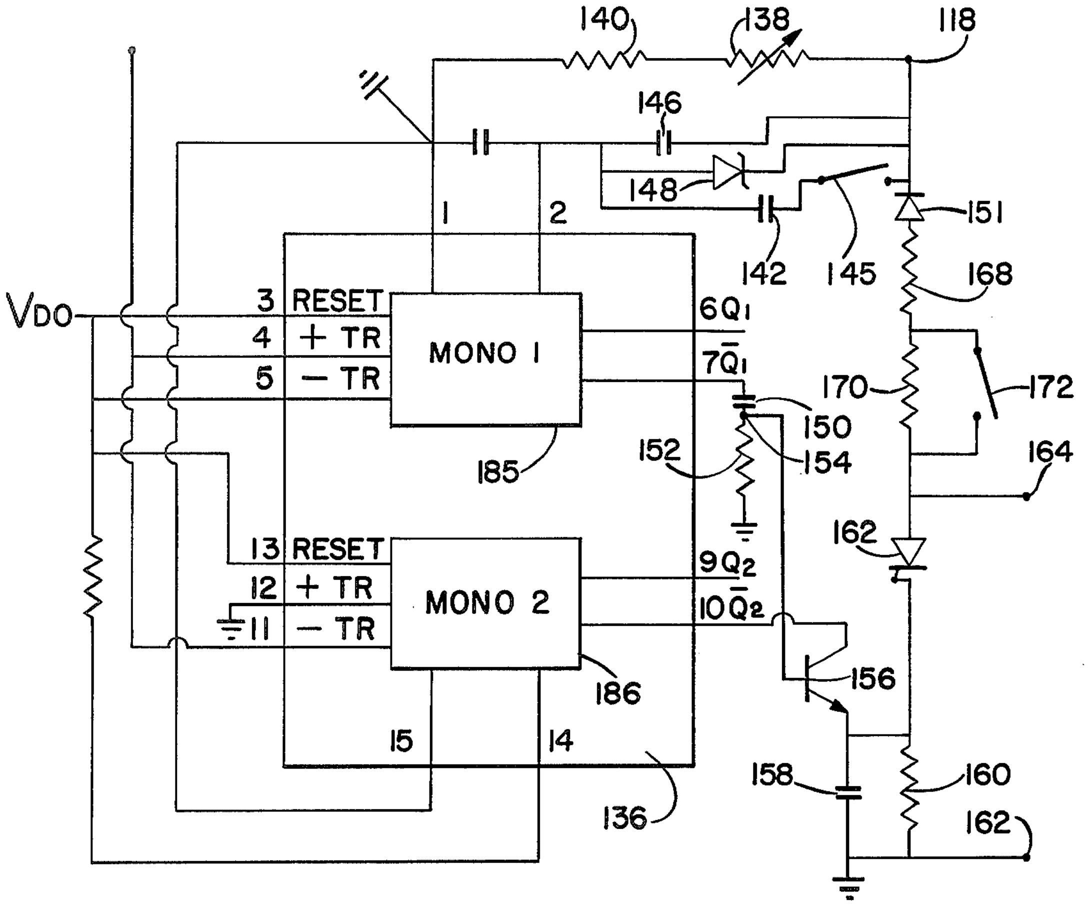
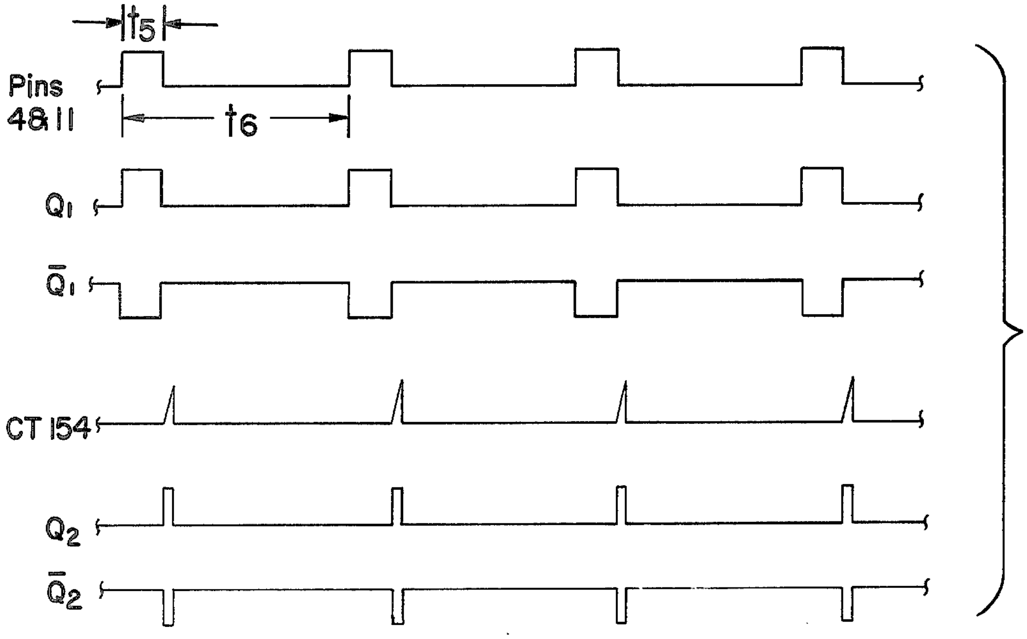
FIG. 7

MULTI-CHANNEL MICROPOWER COMMUNICATION LINK

FIELD OF THE INVENTION

The following invention relates to transmitters and receivers which have the capability of being channel encoded.

BACKGROUND AND SUMMARY OF THE INVENTION

In the past, standard superheterodyne or regenerative transmitter/receiver systems, while having great range, have had drawbacks which caused them to have high current drains and be large in size. This is not required and often undesirable for transmitters and receivers used, for example, in paging systems or for remote actuation of, for example, garage doors or camera remote flash synchronizers, or security alarm systems. In such prior transmitter and receiver systems, two or more piezoresonators are used to establish a channel for existing paging and channelized radio links. The simultaneous transmission of two or more frequencies superimposed on a carrier are amplified, detected and used to activate these piezoresonators to establish the existence of the desired channel. The number of channels is thereby limited to the number of discrete specific piezoresonators or mechanical filters responding to the impressed set of received signals.

A large amount of power is used in such systems, both in establishing the transmitting carrier, modulating this carrier, and providing standby current in receivers using local oscillators. The end result is a requirement of a large battery capacity or other power supply employing, e.g., a transformer, large size, and limited channels with large piezoresonators.

In addition, radio transmitters having average peak power above certain limits are regulated by the federal government. This has created, along with the size and power supply constraints, certain range limits on, e.g., transmitters used for garage door openers, and has required licensing of paging systems having ranges of, e.g., a few miles. By way of example, present garage door openers are specified to have about a 150-foot range, whereas many applications thereof require longer ranges. There is therefore, a great need for transmitter/receivers which can carry information in a plurality of short bursts of pulses having individually high peak power for greater range, but together having a relatively small average peak power over the duration of the plurality of pulses in the burst.

There exists a need for a micro, i.e., miniaturized radio link that can operate on extremely low power in the standby mode and be field programmable with multiple channels for communications or remote control. Up to now, existing radio frequency links required relatively large amounts of power and were quite bulky. The present invention relates to a transmitter and receiver capable of miniaturization and micro-power operation, both for the transmitter and the receiver. The present invention has many useful applications, such as providing radio links to be incorporated in very small housings, for example, the size of a button or key chain for use, for example, with paging receivers and garage door openers, respectively. The present invention could also be used for applications such as electronic door locking devices and, for example, activating remote camera flash units or remote alarms in a security alarm system, coded to the location of the security breach.

The receiver of the present invention is quite small in comparison, e.g., to prior garage door openers, which require, e.g., transformers in their power supply, in order to operate. Thus the receiver of the present invention will decrease significantly the size and cost of a garage door opener receiver, and also is suitable in size for placement, e.g., within a door or door frame for use in an electronic key locking system or on a remote camera flash unit for remotely activating the remote camera flash unit. In fact, the receiver of the present invention could be miniaturized enough to be placed in a coat button or lapel pin in the paging embodiment or even incorporated in a wristwatch housing, employing, e.g., the alarm on the wristwatch as the paging enunciator. In certain applications, for example, remote photo flash operation, the receiver can be connected to the remote flash unit and use the battery or other power source already contained in the flash unit for its power source, if such a flash unit is of a type having a sufficient voltage available across its actuator switch contacts, thereby eliminating any requirement for a power source in the receiver unit itself.

The problems existing in the prior art enumerated in the foregoing are not intended to be exhaustive, but rather are among many which tend to impair the effectiveness of previouslyknown transmitter/receivers used, for example, in paging units, garage door openers, electronic locks, security alarms or remote photographic equipment operation. Other noteworthy problems may also exist; however, those presented above should be sufficient to demonstrate that prior transmitter/receiver units of the foregoing-mentioned type appearing in the art have not been altogether satisfactory.

Recognizing the need for an improved transmitter/-receiver useful for such applications as paging units, garage door openers, electronic keys or remote operation of, for example, photographic equipment, it is, therefore, a general purpose of the present invention to provide a novel miniaturized transmitter/receiver which minimizes or reduces the problems of the type previously noted.

An additional feature of the present invention is a radio transmission link having a relatively great range in comparison to its average peak power.

A further feature of the present invention is the use of integrated circuit chips in the transmitter and receiver to modulate the transmitted frequency into a plurality of pulses of a selected pulse width and duration and the detection in the receiver of a received signal having the selected pulse width and pulse duration in order to activate some remote unit, e.g., a paging enunciator, garage door opener, electronic door lock, security alarm or photographic flash equipment.

Still another feature of the present invention is the ability to select a wide variety of channels by varying the selected pulse width, and tuning the receiver to be selective of only that pulse width, within certain tolerances.

The present invention relates to a transmitter/-receiver employing suitable microchip circuitry to pulse modulate a transmitted, e.g., radio frequency, signal and to demodulate the received signal to detect for a selected pulse width in the transmitted signal, thereby enabling coding of selected channels. The transmitted pulses can be made to have a sufficient peak power to enable transmission of a burst of such pulses of, e.g., 20–30 in number over a range of up to about five to ten miles, but of a sufficiently short individual pulse duration, with a sufficiently long pulse interval, that the average peak power is relatively very small, for example, with a 10 watt peak power in each of 20–30 pulses transmitted within less than a millisecond and with each pulse having only a 10–20 microsecond duration, the average peak power would be less than a milliwatt. The transmitter uses a pair of coupled monostable multivibrators contained on an integrated circuit chip to fix a pulse duration and pulse interval for a plurality of pulses of, e.g., radio frequency, energy, which radio frequency energy is generated in each pulse width by a resonating tank circuit, with the resonation being rapidly clamped to ground at the end of each pulse width. The receiver amplifies and demodulates the received pulses to obtain a plurality of pulses having the pulse width and pulse interval of the received signal with the higher, e.g., radio frequency removed. This plurality of pulses is fed to a pair of coupled monostable multivibrators contained on an integrated circuit chip. The pair of monostables act as a portion of a pulse coincidence circuit. Each generates a coincidence pulse. One monostable generates a coincidence pulse at one transition of each received pulse from one of the two states of each received pulse to the other state. The other monostable generates a coincidence pulse, after a selected time interval from a transition from one state to another of each received pulse. The time interval is selected so that at a given pulse width of the received pulses, within certain tolerances, there will be coincidence of the coincidence pulses. Such coincidence is detected and after a selected number of such coincidences within a selected time period, a trigger circuit in the receiver is actuated.

Examples of the more important features of the present invention have been summarized rather broadly in order that the detailed description thereof that follows may be better understood, and in order that the contribution to the art may be better appreciated. There are, of course, additional features of the invention that will be described hereinafter, and which will also form the subject of the appended claims. Other features and advantages of the present invention will become apparent with reference to the following detailed description of the preferred embodiment thereof, in connection with the accompanying drawings, wherein like reference numerals have been applied to like elements, in which:

BRIEF DESCRIPTION OF THE DRAWINGS

FIG. 6 shows a more detailed view of the connection of the receiver dual monostable multivibrator in the pulse coincidence detection circuit of the receiver;

FIG. 7 shows a pictorial representation of the pulse coincidence detection carried out by the receiver of FIG. 3;

DETAILED DESCRIPTION OF A PREFERRED EMBODIMENT

Figure 1:
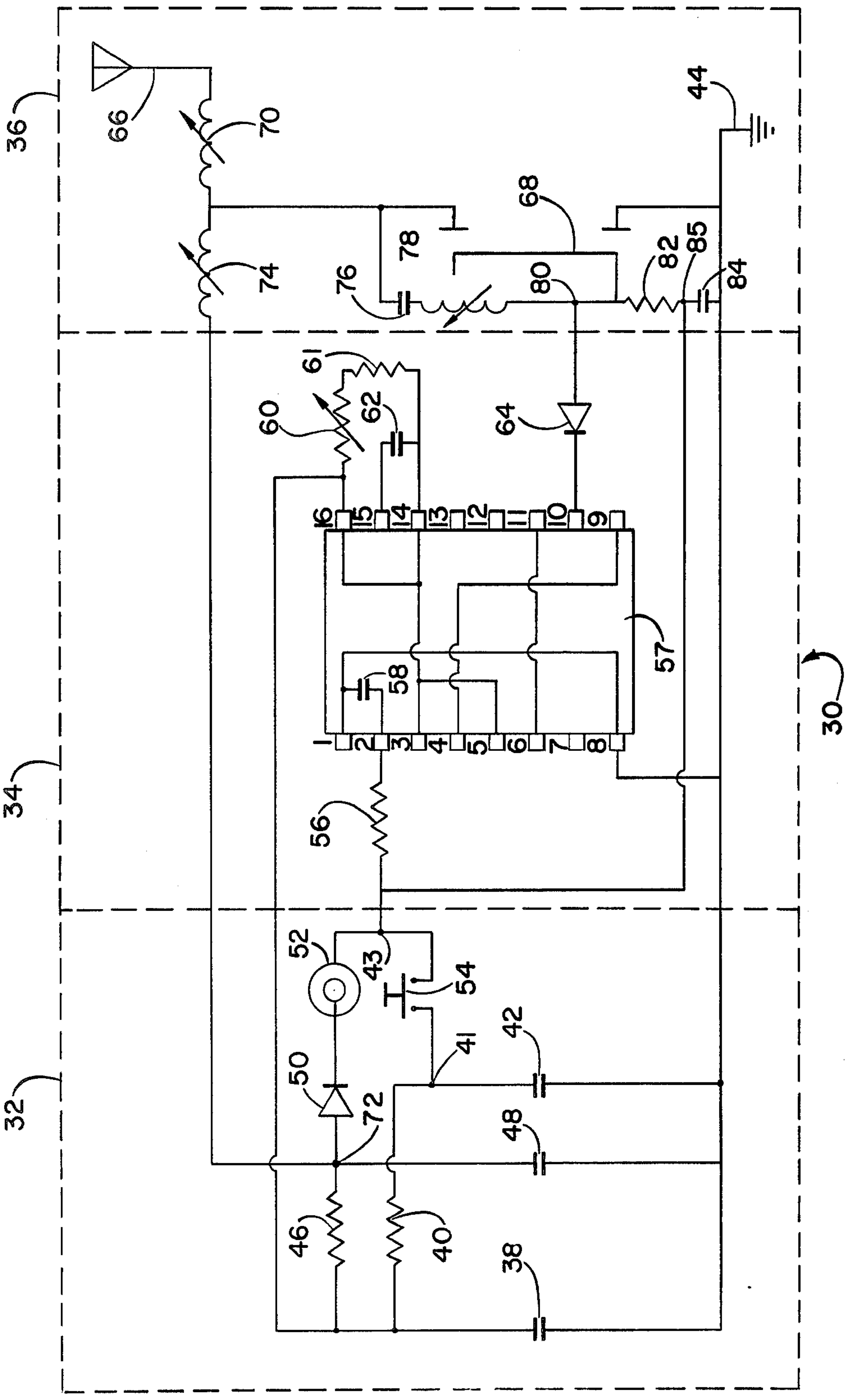
FIG. 1 shows a schematic diagram of the transmitter according to one possible embodiment the present invention employed as a remote camera strobe actuator.

Turning now to FIG. 1, there is shown a transmitter 30 according to the present invention. The transmitter 30 includes a power supply section included within the phantom lines 32, a pulse generator section included within phantom lines 34 and a transmitter drive section included within phantom lines 36. The power supply section 32 includes a DC power source 38 which may be a 15 volt battery. The positive side of the battery 38 is connected to the negative side (or ground) of the battery 38 through a 150 Kohm resistor 40 and a 0.5 microfarad low equivalent series resistance (ESR), e.g., tantallum or low ESR electrolytic capacitor 42. The negative side of the battery is the transmitter ground 44. The positive side of the battery is also connected to ground 44 through a 27 ohm resistor 46 and a 3000 microfarad power supply capacitor 48. The junction 72 between the resistor 46 and capacitor 48 is connected to the junction 41 between the resistor 40 and the capacitor 42 by a diode 50, a photoreceptacle pin switch 52 and a pushbutton switch 54. The junction 43 between the photo receptacle pin switch 52 and pushbutton switch 54 is connected through a 4.7 megaohm resistor 56 to pin 2 of a CD4098 BE RCA CMOS dual monostable multivibrator 57. Pins 1 and 2 of the dual monostable multivibrator 57 are connected through a 5 picofarad capacitor 58. Pin 16 of the dual monostable multivibrator is connected to the system voltage $V_{DD}$ which is the positive side of the battery 38, and is also connected through a variable resistor 60, variable to 5 megaohms and a 2.2 megaohm resistor 61 to pin 14 of the dual monostable multivibrator 57. Pin 15 is connected to pin 14 of the dual monostable multivibrator 57 through a 100 picofarad capacitor 62 which, like the other external timing capacitors in the present invention, is a silvered mica capacitor to ground pin 15. Pin 8 of the dual monostable multivibrator 57 is connected to system ground 44 and also to pin 1. Pins 3, 5, 16 and 13 are connected to ground. Pins 4 and 9 are connected, as are pins 6 and 11 of the dual monostable multivibrator 57. The output on pin 10 of the dual monostable multivibrator 57 is connected through a clamping Slotkky diode 64 to a junction 80 which is connected to the gate of an electronic switch, which may be a high power VMOS field effect transistor 68 (of the kind, e.g., made by Siliconix of Santa Clara, Calif., Model No. VN10KM) or other suitable electronic switch having a sufficiently high input impedance and a sufficiently fast $f_T$, e.g., 600 MHz. The drain of the field effect transistor 68 is connected through a variable inductor 70 to an antenna 66 and to junction 72 through a 2.2 microhenry inductor 74. The drain of the field effect transistor 68 is also connected through a 15 picofarad capacitor 76 and a variable inductor 78 to the junction 80. The gate of the field effect transistor 68 is also connected through a 16 Kohm resistor 82 and a 680 picofarad capacitor 84 to system ground 44. The source of the field effect transistor 68 is connected directly to system ground 44. The junction 85 between the resistor 82 and the capacitor 84 is connected to the junction 43.

Figure 2:
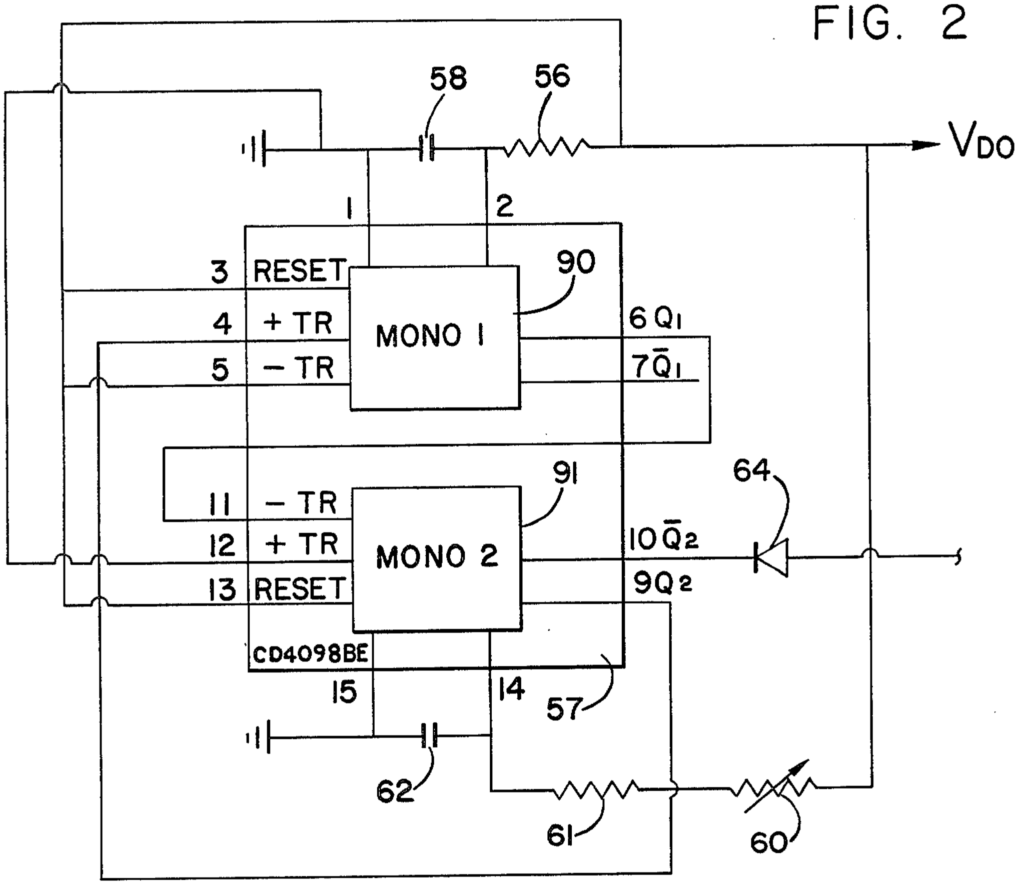
FIG. 2 shows in more detail a transmitter dual monostable multivibrator employed in the present invention.

Turning now to FIG. 2, there is shown a more detailed view of the RCA CD4098 BE CMOS dual monostable multivibrator 57. The RCA CD4098 BE dual monostable multivibrator 57 is of the kind which provides stable retriggerable/resettable one-shot operation for any fixed-high voltage timing application. An external resistor 56 and external capacitor 58 controls the circuit timing for one monostable section 90, and external resistors 60 and 61 and external capacitor 62, control the circuit timing for the second monostable section 91. Adjustment of the external RC time constant, for example, through the use of variable resistor 60, provides for a wide range of output pulse widths from the output terminals for, in the present case, monostable 91 on output terminals 9 and 10. The time delay from the trigger input to output transition (trigger propogation delay) and the time delay from reset input to output transition reset propogation delay) are independent of the resistors 56, 60 and 61 and the capacitors 58 and 62. Each monostable 90, 91 has a leading edge trigger, respectively pins 4 and 12 and a trailing edge trigger, respectively pins 5 and 11. The dual monostable multivibrator 57, as shown in FIG. 2, is connected such that the output of monostable 91 on pin 9 is connected to the leading edge trigger 4 of monostable 90 and the output of monostable 90 on pin 6 is connected to the trailing edge trigger on pin 11 for monostable 91.

Figure 4:
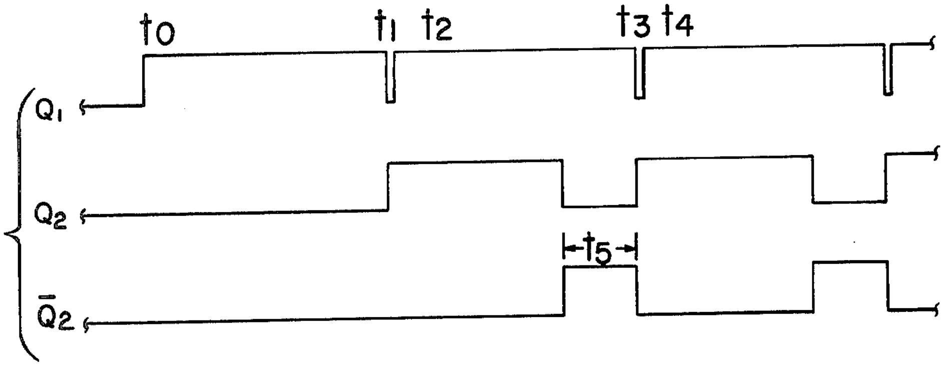
FIG. 4 shows a pictorial representation of how the transmitter dual monostable multivibrators fix the pulse width and pulse interval of the transmitted pulses shown in FIG. 3.

When pushbutton 54 is depressed, the charge on capacitor 42 is impressed upon the dual monostable multivibrator 57 at pin 2 through resistor 56. When switch 52 is shut, capacitor 84 is charged from capacitor 48 during the brief time switch 52 is shut, because switch 52 is shut by contacts associated with a camera lens shutter. Capacitor 84 retains enough charge to function just as capacitor 42 does when pushbutton switch 54 is shut manually. Capacitor 58 is thereby charged, which, together with resistor 56, sets the time constant for monostable 90. Monostable 90 then provides an output pulse on pin 6, $Q_1$. As shown in FIG. 4, this pulse has a time constant from $t_0$ to $t_1$, which depends upon the RC time constant of resistor 56 and capacitor 58. When the monostable 90 times out at $t_1$ and goes low, the trailing edge triggers monostable 91 due to pin 6 being connected to the trailing edge trigger on pin 11 of monostable 91. This provides an output pulse, $Q_2$, on pin 9 as shown in FIG. 4, having a time constant depending upon the RC constant of resistors 61 and 60 and capacitor 62. The output $Q_2$ on pin 9 retriggers the monostable 90 at $t_2$ which is essentially immediately after $t_1$. The time constant for monostable 90 is longer than the time constant determined by resistors 60 and 61 and capacitors 62 for monostable 91 so that the pulse duration of $Q_2$ is shorter, as shown in FIG. 4. Thus, the timing out of the monostable 90 at $t_3$ would again provide a trailing edge trigger for monostable 91, which will in turn trigger monostable 90 at time $t_4$ essentially immediately after $t_3$. Thus, the pulse width of $Q_2$ on pin 9 and the pulse width of the inverted $Q_2$ signal on pin 10 shown in FIG. 4 is determined by the RC time constant for resistors 61 and 60 and capacitor 62 and the pulse repetition rate for $Q_2$ and the inverted $Q_2$ is determined by the RC time constant of resistor 56 and capacitor 58. The initial charge available on either capacitor 42 or capacitor 84, in the alternative operations explained above, determines the amount of time during which either capacitor will have a sufficient charge to continue triggering the dual monostable multivibrator 57, and thus the total number of output pulses thereof, which can be, e.g., from 10–30 normally, but could be set to be more or less in number. Capacitor 42 gradually discharges and its total discharge time determines how long the Astable Multi operates. This determines the number of output pulses. This operation is with pushbutton only. The other way the circuit is activated is through the camera shutter closing the P.C. connector. The number of pulses here is determined by how long the shutter contacts are closed and the charge on capacitor 84.

The inverted output of monostable 91 on pin 10 shown in FIG. 4 is applied to the gate of the field effect transistor 68 through clamping diode 64. The tank circuit, comprised of capacitor 76 and inductor 78, results in a resonant standing wave of, e.g., radio frequency being impressed upon the antenna through inductor 70 during the duration of the inverted $Q_2$ pulse, with the pulse width thereof being sufficiently short that the resonanting standing wave does not significantly die out in frequency or amplitude prior to the occurrence of the trailing edge of the pulse of the inverted $Q_2$, and, upon the occurrence of the trailing edge, the biasing effect on field effect transistor 68 of clamping diode 64 immediately terminates the standing wave.

Figure 3:
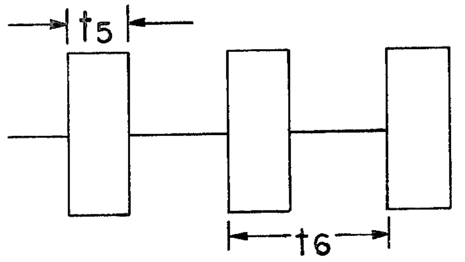
FIG. 3 shows a pictorial representation of the pulses of high frequency transmission produced by the transmitter of FIG. 1.

Thus, an output of discrete pulses of, e.g., radio frequency energy, having a selected pulse width $t_5$ and a selected pulse repetition rate, $t_6$, is transmitted over the antenna 66, as illustrated in FIG. 3. Variable inductors 78 and 70 are used to tune the tank circuit and antenna 66 to the desired resonant frequency, e.g., 50 MHz or 70 MHz, and the antenna 66 has a selected number of windings in its coil to most efficiently broadcast the selected frequency, e.g., 80 turns at 70 MHz and 116 turns at 50 MHz.

Figure 5:
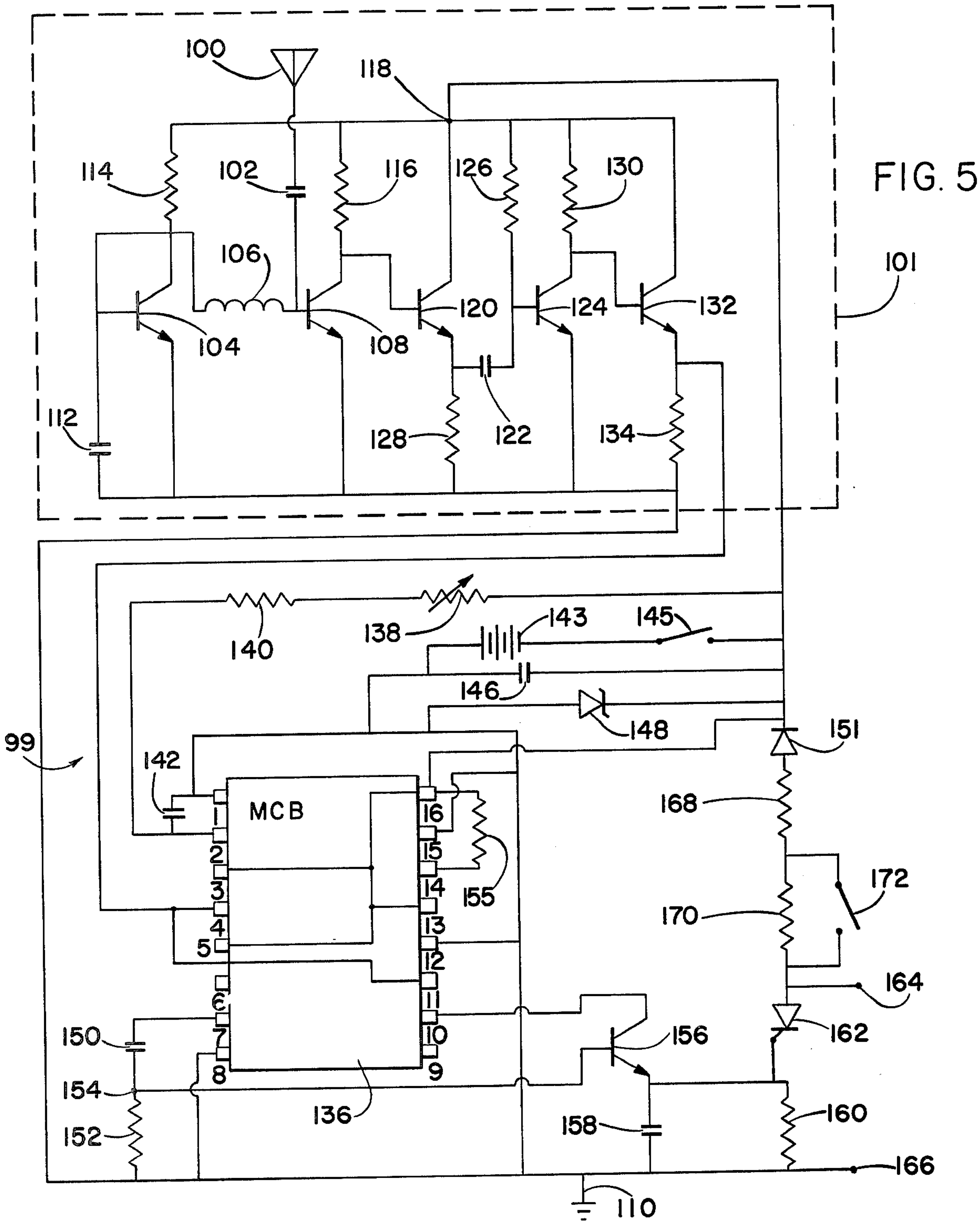
FIG. 5 shows a schematic diagram of a receiver according to the embodiment of the present invention employed in the remote camera strobe actuating application.

FIG. 5 shows a schematic diagram of a receiver 99 according to the present invention. The receiver 99 has an antenna 100 which is coupled to a 3.5 or greater gigahertz high-frequency array, e.g., an RCA 3127E high-frequency array contained within phantom lines 101 through a 15 picofarad capacitor 102. The high-frequency array contained within phantom lines 101 in FIG. 5 contains an antenna tank circuit consisting of a variable slug tuned ferrite inductor 106 and the input capacitance of a transistor 108, the base of which is connected to the inductor 106, and to capacitor 102. A current mirror biasing stage consisting of a 3 megaohm resistor 114, a 100 microfarad capacitor 112 and a transistor 104 provides a steady biasing for transistor 108. Transistor 108 provides a function of infinite impedance detection and voltage amplification of the input signal received from the antenna 100. The collector of transistor 108 is connected to the system power supply voltage at junction 118 through a 1.5 megaohm resistor 116, and is directly connected to the base of a current amplifying transistor 120. The emitter of current amplifying transistor 120 is connected to system ground through a 1.5 megaohm resistor 128 and is connected through a 0.1 microfarad capacitor 122 to the base of a voltage amplifying transistor 124. The base of the voltage amplifying transistor 124 is also connected through a 10 megaohm resistor 126 to the system power supply voltage. A 1.5 megaohm resistor 130 connects system power supply voltage to the collector of the voltage amplifying transistor 124. The voltage amplifying transistor 124 collector is also connected to the base of a current amplifying transistor 132, the emitter of which is connected through a 450 Kohm resistor 134 to system ground. The output of the 3127E high-frequency array 101 is a square wave pulse train with the pulse width corresponding to the pulse width of the received pulses of energy corresponding to those transmitted by the transmitter 30, as described above, and a pulse repetition rate, similarly corresponding to the received pulse repetition rate, having the transmitted high, e.g., radio, frequency removed.

This train of pulses is provided to pins 4 and 11 of a Motorola MC14538B Dual monostable multivibrator 136. The Dual-Multi 136 is similar in circuit construction and functional operation to the dual monostable multivibrator 57, but is selected because of its higher precision, sensitivity and accuracy, and lower response time. The Dual-Multi 136 is connected to system power supply voltage through a variable resistor 138, variable to 5 megaohms, and a 1.5 megaohm resistor 140 at pin 2 of the Dual-Multi 136, with a 100 picofarad low ESR capacitor 142 connected between pins 1 and 2 of the Dual-Multi 136. The Dual-Multi has pins 3, 5, 16 and 13 interconnected to the system power supply voltage and is grounded at pin 8. Pin 7 is connected to ground through a 220 picofarad capacitor 150 and a 75 Kohm resistor 152. The junction 154 between capacitor 150 and resistor 152 is connected to the gate of an NPN transistor 156, the emitter of which is connected to ground through a 0.33 farad capacitor 158 in parallel with a 75 Kohm resistor 160. The emitter of the transistor 156 is also connected to the control gate of a silicon controlled rectifier 162. Pin 14 of the Dual-Multi 136 is connected through a 4.7 megaohm resistor 155 to the system power supply voltage at pin 16. Pins 1, 8, 12 and 15 of the Dual-Multi 136 are connected to ground. The anode of the silicon controlled rectifier 162 is connected to node 118 through a 75 Kohm resistor 168 and a 4.7 megaohm resistor 170, with a switch 172 in parallel with the 4.7 megaohm resistor 170. The output of the receiver 99 in the application illustrated in FIG. 5 in which the receiver 99 is used for remotely energizing another circuit, for example, a camera flash attachment or a garage door opener, is taken from the anode of the silicon control rectifier 162 to system ground, thus the output is a voltage spike when the silicon control rectifier 162 is triggered, which voltage spike provides an actuating input to a further circuit, not shown.

A 100 microfarad power supply capacitor 142 is connected between node 118 and ground. A 15 volt battery 143 and a switch 145 are connected in parallel with the power supply capacitor 142, as is a C8U zener diode 148.

The operation of the receiver 99 can be better understood by viewing FIGS. 5 and 6. In operation, the radio frequency containing pulses collected by the antenna 110 are coupled to the high frequency array 101 through capacitor 102 (effectively eliminating low frequency fields) and provide an input to the antenna tank circuit formed by the inductor 106 and the internal capacitance of the infinite impedance detector transistor 108. The current mirror of the stage formed by transistor 104 presents a steady input bias for transistor 108. Further current and voltage amplification through the succeeding stages of the high frequency array 101 increases the signal level to approximately 5 volts and the pulse-modulated signal is applied to the Dual-Multi 136 at both of its sections on pins 4 and 11. The first section, monostable 185, whose time constant is controlled by the setting of variable resistor 138, passes its inverted signal on pin 7 to a differentiation network formed by capacitor 150 and resistor 152, producing a first coincidence pulse in the form of a positive voltage spike after each preset time constant when the first section of the Dual-Multi 136 times out, i.e., at the initiation of the inverted pulse on pin 7. The second section, monostable 186, of the Dual-Multi 136, functions as a Schmidt trigger, e.g., an inverting Schmidt trigger responsive to the input pulse waveform on pin 11, and producing a second coincidence pulse on, e.g., the negative transition of the input pulse on pin 14, with the pulsewidth of the second coincidence depending on the time constant of the second section 186 of the Dual-Multi. The internal interelectrode capacitance between pins 15 and 14 of the Dual-Multi 136 determines the time constant of the second section 186, along with resistor 155. This is set for a very short interval on the order of, e.g., 10–20 microseconds.

The transistor 156 is used as a pulse coincidence detector. Only when the outputs from the differentiation network formed by capacitor 150 and resistor 152 and the output from the second stage of the Dual-Multi 136 on pin 10 occur simultaneously does the transistor 156 conduct to charge capacitor 158. Thus, in the embodiment shown, when the first monostable 185 times out at the same time, within some tolerance, as the input pulses to both monostables 185 and 186 make a negative transition, pulse coincidence of the first and second coincidence pulses occurs. Capacitor 158 and resistor 160 have selected values such that at least a selected number of, e.g. four, such pulse coincidences are necessary and must occur within a narrow time period, such as the duration of the pulse train received from the transmitter, i.e., 10–30 pulses, in order for capacitor 158 to be charged sufficiently, i.e. to about 0.8 volts, to fire the silicon control rectifier 162. It is also possible to select the values of capacitor 158 and resistor 160 so that the coincidence must occur within a narrower time period, or even it must occur within the time period which would be occupied by the selected number of pulses, e.g., four pulses, in order for capacitor 158 to be sufficiently charged. Thus this portion of the circuit serves to eliminate false receiver activation due to extraneous noise or other nonvalid signal inputs.

In the embodiment shown in FIGS. 5 and 6, the receiver 99 is adapted for triggering a camera strobe flash (not shown) which is connected to output pins 164, 166 of the receiver 99. Some such strobe flashes have a voltage of around 400 volts available across pins 164, 166. Others have only a lesser voltage, e.g., around 8 volts. Thus switch 172 is provided to remove resistor 170 from the circuit when only the lesser voltage is available. Resistor 170 acts to protect the circuits in the receiver from the higher voltage across pins 164, 166 in those strobe flashes which have that higher voltage across the pins 164, 166. In some newer models of strobe flashes, the design is such as to protect the strobe switch contacts, and no voltage is available across pins 164, 166. In that event, switch 145 is shut, and battery 143 provides system voltage. Diode 151 blocks the high voltage which may exist across pins 164, 166 from entering the system, when the silicon controlled rectifier 162 conducts, and also prevents draining of the power supply capacitor 146 when the silicon controlled rectifier 162 conducts.

FIG. 7 shows the operation of the receiver. Pins 4 and 11 receive the input pulse train 195 received by the antenna 100 with the radio frequency removed, and having the pulse width $t_5$ and pulse interval $t_6$ of the transmitted pulses. The first receiver monostable 185 has a time constant set by variable resistor 138 to give the output of the first monostable 185 on pin 6, $Q_1$, the identical pulse width as the pulses received on pin 4, with the positive transition of each pulse received on pin 4 triggering the first receiver monostable 185. The inverted output of the first monostable 185 on pin 7, $\bar{Q}_1$, is fed to the differentiation circuit of resistor 152 and capacitor 150 so that the output on junction 154 is a positive pulse at each positive transition of $\bar{Q}_1$, which corresponds to the negative transitions of $Q_1$, and also, if the first monostable 185 time constant is set properly, to the negative transitions of the pulses on pin 4. The second monostable 186 is set to be triggered by the negative transition of each pulse on pin 11, which are the identical pulses as are on pin 4. The time constant of the second monostable 186 is set to be very short in duration, roughly equal to the duration of the pulse on junction 154, e.g., 10–20 microseconds. Thus the output of the second monostable 186 on pin 9 is a short duration positive pulse at each trailing edge of each pulse on pin 11, since pin 11 is the negative trigger of the second monostable 186. Therefore, if the time constant of the first monostable 185 is set properly, i.e., tuned to the pulse width of the transmitted pulses, there will exist pulse concidence of the pulses at junction 154 and on pin 9, which will cause the transistor 156 to conduct to charge capacitor 158. Depending on the size of capacitor 158 and resistor 160, this charge will bleed off of capacitor 158 at some rate. This rate, along with the magnitude of the pulses on pin 10 and the duration of the conduction by transistor 156, determines how many coincidences must occur and within what time period in order to charge the capacitor 158 sufficiently to trigger the silicon controlled rectifier 162 into conduction. When the silicon controlled rectifier 162 conducts, it acts as a short circuit to ground, and effectively as a closed switch in whatever circuitry to which the receiver 99 is attached and intended to activate.

Figure 8:
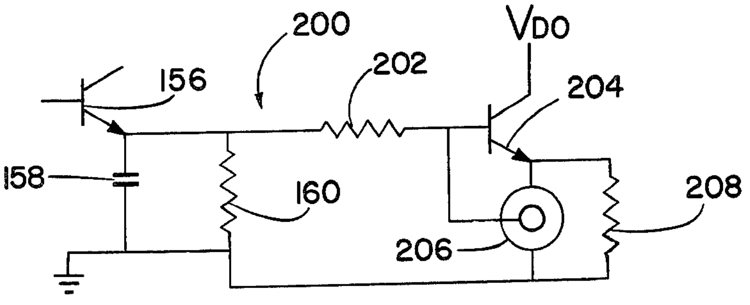
FIG. 8 shows another embodiment of the receiver, employed as a remote paging unit.

A further embodiment of the present invention is shown in FIG. 8, in which the silicon controlled rectifier 162 of the receiver 99 is replaced by a paging enunciator 200. The paging enunciator 200 is connected to the pulse coincidence detection circuit 156, 158, 160 through a 500 Kohm resistor 202. The paging enunciator 200 has an enunciator transistor 204, the base of which is connected to a 500 Kohm resistor 202, the collector of which is connected to system voltage $V_{DD}$ and the emitter of which is connected to system ground through a parallel circuit containing a piezobuzzer 206 and a 2.7 Kohm resistor 208. In operation, once the capacitor 158 is sufficiently charged, the transistor 204 conducts and the piezobuzzer 206 sounds. However, no system voltage is drawn by the piezobuzzer 206 prior to conduction of the transistor 204.

SUMMARY OF THE ADVANTAGES AND SCOPE OF THE INVENTION

It will be seen that the present invention provides an extremely useful means of transmitting pulse coded information over great ranges at very low average peak power, and receiving and decoding that pulse coded information to perform the function of activating some remote circuit. The invention has wide application in, e.g., remote camera strobe flash actuation, garage door openers, security systems, electronic door keys and remote paging units. The microcircuitry employed in the present invention enables its use in very small transmitters and receivers with extremely low current drains. Thus the transmitter could be encased in a housing suitable for mounting on the flash attachment shoe of, e.g., a 35 MM camera and the receiver forming a part of the housing of or adapted for attachment to a camera strobe flash attachment positioned at some remote location from the camera. The transmitter is also capable of being made small enough to be suitable for encasement in, e.g., an epoxy resin in a size suitable for attachment to a key ring for use in the garage door opener and electronic door key uses. The transmitter could also be placed in or on a door or window frame, with the pushbutton switch being a microswitch shut by the opening of the door or window, or be attached to a photoelectric switch, as part of a security system. The receiver can be made small enough to be placed in a tiny housing the size of, e.g., a button or lapel pin, having a disc-shaped, e.g., cadmium battery for the receiver power supply, with the entire housing not much larger than the battery, e.g., two to three times the total volume of the battery. In the garage door opener application, e.g., the garage door opener step down transformer connecting it to ordinary house current can be eliminated.

The foregoing description of the invention has been directed to preferred embodiments thereof in accordance with the requirements of the patent statutes and for purposes of illustration. It will be apparent, however, to those skilled in the art that many changes and modifications of the invention can be made without departing from the scope and spirit of the invention. For example, other means of generating pulses in coincidence dependent upon the pulse width of the received pulse and a generated pulse having a selected pulse width corresponding to the transmitted pulse width, to thereby define the proper pulse width encoded channel, e.g., an and gate or other logic circuitry could be connected to the differentiation circuit and the output of the receiver second monostable. The possible applications of the invention have been given as illustrative only, and it will be understood that the invention can be used in a wide variety of applications where it is desired to activate some remote circuitry with a transmitter using pulse width encoded channels. It will further be understood that the circuitry of the present invention could be modified to be responsive to the pulse interval of the transmitted pulses, e.g., where the one coincidence pulse is generated upon the occurrence of a selected interval (corresponding to the received pulse interval) from the leading edge of a preceding received pulse and the other coincidence pulse is generated upon the occurrence of the leading edge of the next succeeding received pulse. It will be further understood that the invention can be utilized with other modifications within the state of the art. These other modifications will be apparent to those skilled in the art. It is the applicant's intention in the following claims to cover all such equivalent modifications and variations as fall within the scope of the invention.

What is claimed is:

1. A remote controlling apparatus comprising: a transmitter including:

a pulse generating circuit, the output of which is a plurality of pulses of radiant energy, each having an envelope of a selected pulse width and with a selected pulse interval; a receiver including:

an envelope detection circuit, the output of which is a plurality of pulses each having the selected pulse width and with the selected pulse interval of the transmitted radiant energy envelope, each output pulse of the envelope detection circuit having a first transition from a first state to a second state and a second transition from the second state to the first state;

a first coincidence pulse generating circuit coupled to the output of the envelope detection circuit, the output of the first coincidence pulse generating circuit being a pulse occurring at a selected time after one of the first and second transitions of each pulse from the envelope detection circuit;

a second coincidence pulse generating circuit coupled to the output of the envelope detection circuit, the output of the second coincidence pulse generating circuit being a pulse, generated in response to, and occurring coincidentally with, one of the first and second transitions in each of the plurality of output pulses from the envelope detection circuit;

a pulse coincidence detection circuit coupled to the first and second coincidence pulse generating circuits, which is adapted to provide an output in response to the coincidence of a selected number of output pulses from the first and second coincidence pulse generating circuits within a selected time interval.

2. The apparatus of claim 1 further comprising:

a first pair of coupled first and second monostable multivibrators within the transmitter, the output of the first connected to the trigger of the second, with the time constant of the first related to the time constant of the second, such that the output of the second is a plurality of pulses having a selected pulse width and a selected pulse interval;

a resonant frequency generator coupled to the output of the second monostable multivibrator and adapted to generate a resonant frequency during the duration of each output pulse, thereby producing a signal for transmission comprising a plurality of pulses of the resonant frequency each contained within an envelope defined by the pulse width of the output pulses of the second monostable multivibrator;

a second pair of coupled first and second monostable multivibrators within the receiver, each coupled to the envelope detection circuit;

a differentiating circuit coupled to the output of the first receiver monostable multivibrator;

the output pulse width of the first receiver monostable multivibrator being of a preselected width;

the output of the second receiver monostable multivibrator comprising a pulse responsive to and coincident with the other of the first and second transitions of each of the output pulses from the envelope detection circuit.

3. The apparatus of claim 2 further comprising:

a resonant tank circuit coupled to an antenna for the transmitter;

a tank circuit excitation circuit coupled to the tank circuit and the output of the second transmitter monostable multivibrator, adapted to excite the tank circuit during the duration of each output pulse from the second transmitter monostable multivibrator, and including a clamping diode to terminate the resonant frequency upon the occurrence of the end of the respective output pulse from the second transmitter monostable multivibrator;

an electronic switch coupled to the outputs of the first and second receiver monostable multivibrators and adapted to close upon the coincidence of the outputs of the first and second receiver monostable multivibrators to thereby incrementally charge a capacitor coupled to the electronic switch.

4. The apparatus of claim 4 further comprising:

the tank circuit excitation circuit including a field effect transistor;

a trigger circuit coupled to the capacitor and adapted to the triggered in response to a selected charge on the capacitor.

5. The apparatus of claim 4 further comprising:

the trigger circuit including a silicon controlled rectifier.

6. The apparatus of claims 2, 3, 4 or 5 further comprising:

the resonant frequency being a radio frequency.

7. The apparatus of claims 1, 2, 3, 4 or 5 further comprising:

the pulse width and pulse interval of the output of the transmitter being selected such that the average peak power of the output of the transmitter is very low in comparison to the peak power of each output pulse of the receiver.

8. The apparatus of claims 2, 3, or 4 further comprising:

the resonant frequency being a radio frequency;

the pulse width and pulse interval of the output of the transmitter being selected such that the average peak power of the output of the transmitter is very low in comparison to the peak power of each output pulse of the receiver.

9. The apparatus of claim 4 further comprising:

the field effect transistor being a high power VMOS field effect transistor.

10. A remote controlling apparatus transmitter comprising:

a pulse generating circuit, the output of which is a plurality of pulses of radiant energy, each having an envelope of a selected pulse width and with a selected pulse interval including a first pair of coupled first and second monostable multivibrators within the transmitter, the output of the first connected to the trigger of the second, with the time constant of the first related to the time constant of the second, such that the output of the second is a plurality of pulses having a selected pulse width and a selected pulse interval;

a resonant frequency generator coupled to the output of the second monostable multivibrator and adapted to generate a resonant frequency during the duration of each output pulse, thereby producing a signal for transmission comprising a plurality of pulses of the resonant frequency, each contained within an envelope defined by the pulse width of the output pulses of the second monostable multivibrator;

an antenna;

a resonant tank circuit coupled to the antenna;

a tank circuit excitation circuit coupled to the tank circuit and the ouptput of the second transmitter monostable multivibrator, adapted to excite the tank circuit during the duration of each output pulse from the second transmitter monostable multivibrator, and including a clamping diode to terminate the resonant frequency upon the occurrence of the end of the respective output pulse from the second transmitter monostable multivibrator.

11. The apparatus of claim 10 further comprising:

the tank circuit excitation circuit including a field effect transistor.

12. The apparatus of claim 10 further comprising:

the resonant frequency being a radio frequency.

13. The apparatus of claim 10 further comprising:

the pulse width and pulse interval of the output of the transmitter being selected such that the average peak power of the output of the transmitter is very low in comparison to the peak power of each output pulse of the receiver.

14. The apparatus of claim 10 further comprising:

the resonant frequency being a radio frequency;

the pulse width and pulse interval of the output of the transmitter being selected such that the average peak power of the output of the transmitter is very low in comparison to the peak power of each output pulse of the receiver.

15. The apparatus of claims 2, 3, 4, 5, or 10 further comprising:

an antenna tuned to the resonant frequency.

16. The apparatus of claims 1, 2, 3, 4, 5, or 10 further comprising:

a receiver antenna coupled to an inductor connected to the base of an NPN transistor, thereby forming a receiver antenna tank circuit with the interelectrode capacitance of the transistor.

* * * * *